(12) United States Patent
Schlüter

(10) Patent No.: US 8,661,964 B2
(45) Date of Patent: Mar. 4, 2014

(54) VACUUM-ASSISTED BRAKE-FORCE BOOSTER FOR A MOTOR-VEHICLE BRAKING SYSTEM

(75) Inventors: Peter Schlüter, Kammerforst (DE); Frank Schlüter, legal representative, Boppard (DE); Alexander Schlüter, legal representative, Kammerforst (DE); Stefan Schlüter, legal representative, Kammerforst (DE); Irina Gerdt, legal representative, Kammerforst (DE)

(73) Assignee: Lucas Automotive GmbH, Koblenz (DE)

( * ) Notice: Subject to any disclaimer, the term of this patent is extended or adjusted under 35 U.S.C. 154(b) by 841 days.

(21) Appl. No.: 12/738,446

(22) PCT Filed: Oct. 7, 2008

(86) PCT No.: PCT/EP2008/008448
§ 371 (c)(1),
(2), (4) Date: Sep. 14, 2010

(87) PCT Pub. No.: WO2009/052941
PCT Pub. Date: Apr. 30, 2009

(65) Prior Publication Data
US 2010/0242717 A1   Sep. 30, 2010

(30) Foreign Application Priority Data
Oct. 18, 2007 (DE) .......................... 10 2007 049 960

(51) Int. Cl.
*B60T 13/52* (2006.01)
(52) U.S. Cl.
USPC ........................................................ 92/169.3
(58) Field of Classification Search
USPC .................. 92/169.2, 169.3, 169.4; 91/369.2, 91/369.3, 376 R
See application file for complete search history.

(56) References Cited

U.S. PATENT DOCUMENTS 4,484,509 A * 11/1984 Belart et al. ................. 92/169.4
4,905,573 A    3/1990 Miyazaki et al.
(Continued)

FOREIGN PATENT DOCUMENTS

| DE | 2942024 A1 | 5/1980 |
| DE | 3837549 C2 | 4/1997 |
| GB | 2034429 A | 6/1980 |

*Primary Examiner* — Thomas E Lazo
(74) *Attorney, Agent, or Firm* — MacMillan, Sobanski & Todd, LLC

(57) ABSTRACT

The invention relates to a vacuum-assisted brake-force booster for a motor-vehicle braking system with:
  a force-input member which is capable of being coupled with a brake pedal,
  a control-valve device which is capable of being actuated in accordance with a displacement of the force-input member,
  a tandem chamber arrangement with a first and a second working chamber and with a first and a second vacuum chamber and with
  a force-output member for delivering an actuating force to a master-brake-cylinder arrangement,
wherein the first working chamber and the first vacuum chamber are separated from one another via a first movable wall, and the second working chamber and the second vacuum chamber are separated from one another via a second movable wall and in each instance are optionally capable of being connected to one another via the control-valve device and wherein at least one pneumatic connecting element is provided, via which the first working chamber is permanently connected to the second working chamber.
With this booster, for the purpose of simplifying the structure there is provision that the pneumatic connecting element is fitted to the first movable wall and to the second movable wall.

12 Claims, 1 Drawing Sheet

(56) References Cited

U.S. PATENT DOCUMENTS

| | | | |
|---|---|---|---|
| 6,212,993 B1 * | 4/2001 | Larumbe | 91/369.3 |
| 6,253,656 B1 * | 7/2001 | Gilles | 91/367 |
| 6,588,317 B2 * | 7/2003 | Petin et al. | 92/169.3 |
| 6,755,117 B2 * | 6/2004 | Vermoesen et al. | 92/169.2 |
| 6,772,674 B2 * | 8/2004 | Kasselman et al. | 92/169.3 |
| 7,331,275 B2 * | 2/2008 | Sexton et al. | 92/169.3 |

* cited by examiner

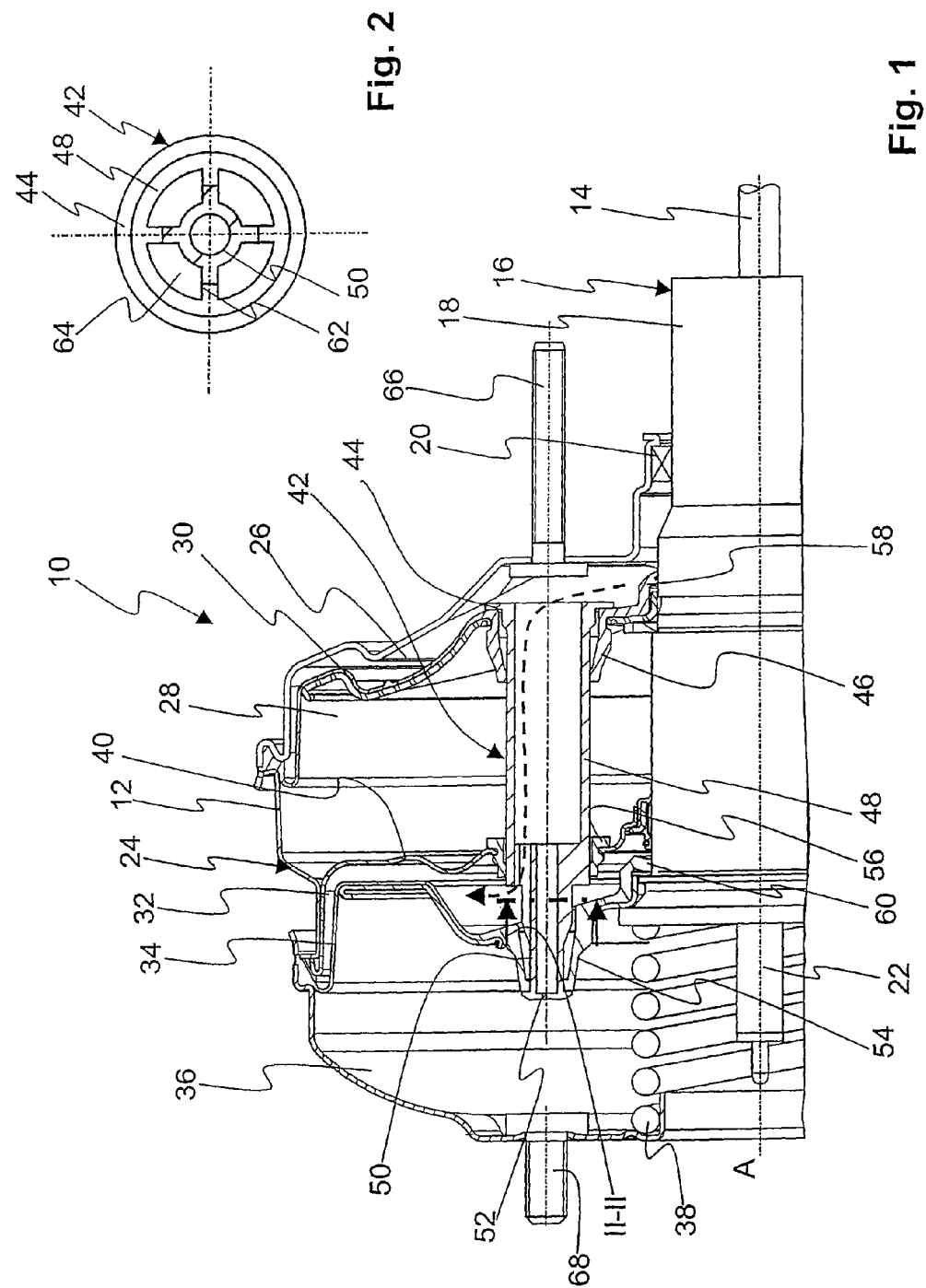

VACUUM-ASSISTED BRAKE-FORCE BOOSTER FOR A MOTOR-VEHICLE BRAKING SYSTEM

CROSS-REFERENCE TO RELATED APPLICATIONS

This application is a national stage of International Application No. PCT/EP2008/008448 filed Oct. 7, 2008, the disclosure of which is incorporated herein by reference, and which claimed priority to German Patent Application No. 10 2007 049 960.6 filed Oct. 18, 2007, the disclosure of which is incorporated herein by reference.

BACKGROUND OF THE INVENTION

The present invention relates to a vacuum-assisted brake-force booster for a motor-vehicle braking system with
 a force-input member which is capable of being coupled with a brake pedal,
 a control-valve device which is capable of being actuated in accordance with a displacement of the force-input member,
 a tandem chamber arrangement, with a first and a second working chamber and with a first and a second vacuum chamber and with
 a force-output member for delivering an actuating force to a master-brake-cylinder arrangement,
wherein the first working chamber and the first vacuum chamber are separated from one another via a first movable wall, and the second working chamber and the second vacuum chamber are separated from one another via a second movable wall, and in each instance are optionally capable of being connected to one another via the control-valve device and wherein at least one pneumatic connecting element is provided, via which the first working chamber is permanently connected to the second working chamber.

A vacuum-assisted brake-force booster of such a type is known from the state of the art.

For instance, document DE 29 42 024 A1, and corresponding UK Patent Application No. GB 2 034 429 A, both of which are incorporated by reference herein, presents in FIG. 3 a vacuum-assisted brake-force booster with a tandem chamber arrangement. With this vacuum-assisted brake-force booster a pneumatic connection between corresponding working chambers of the tandem chamber arrangement is obtained by means of tension bolts of hollow design. However, it has become evident that in more-modern vacuum-assisted brake-force boosters the tension bolts are to be omitted more and more, and that only corresponding fastening bolts, which do not extend right through the booster housing, are fitted to the outside of the booster housing.

By way of further document pertaining to the state of the art, reference is made to U.S. Pat. No. 6,772,674 B2, which is incorporated by reference herein. This document likewise presents a vacuum-assisted brake-force booster with tandem chamber arrangement, the two working chambers being pneumatically connected to one another via a tubular element. The tubular element is tightly fitted to the booster housing, whereby the first movable wall, which separates the first working chamber from the first vacuum chamber, is able to slide on this tubular element in mobile manner. A similar solution is known furthermore from document U.S. Pat. No. 6,588,317 B2 and also from document U.S. Pat. No. 6,755,117 B2.

BRIEF SUMMARY OF THE INVENTION

One feature of the present invention is to make available a vacuum-assisted brake-force booster of the type indicated in the introduction, with which a simple and permanently stable connection between the two working chambers, even while avoiding tension bolts, is guaranteed.

This feature is achieved by a vacuum-assisted brake-force booster of the type indicated in the introduction, with which there is provision that the pneumatic connecting element is fitted to the first movable wall and to the second movable wall.

In accordance with the invention, the pneumatic connecting element is thus substantially tightly fitted to both movable walls, which move towards one another in largely synchronous manner. As a result, a stable arrangement, with a reliable connection of the two working chambers, is guaranteed.

A further development of the invention provides that the pneumatic connecting element is of hollow design and is guided in sealing manner within a positionally stable partition, the partition separating the first vacuum chamber from the second working chamber in sealing manner. The pneumatic connecting element is accordingly guided through the positionally stable partition, in which connection a corresponding sealing element is arranged in said partition. By virtue of the guidance within this sealing element in the positionally stable partition, the pneumatic connecting element is supported at three places, namely at its points of attachment to the first and second movable walls and also by virtue of its relatively movable bearing position within the sealing element in the partition. As a result, a reliable guidance can be obtained, and instances of jamming within the brake-force booster can be prevented.

A further development of the invention provides that the pneumatic connecting element exhibits an abutment flange, with which it bears against the first movable wall. By virtue of this measure, the pneumatic connecting element can be connected to the first movable wall more securely. Furthermore, there may be provision that a first circumferential ring seal is arranged between the first movable wall and the pneumatic connecting element. As desired, this ring seal may be more rigidly or less rigidly designed, in order thereby also to adjust the quality of the guidance of the pneumatic connecting element as desired. In an embodiment variant of the invention there may be provision that the first circumferential ring seal is integrally formed with the first movable wall.

Furthermore, an embodiment of the invention provides that the pneumatic connecting element exhibits a front flange, with which it bears against the second movable wall in sealing manner. As described with regard to the first movable wall, also in this connection there may be provision that a second circumferential ring seal is arranged between the second movable wall and the pneumatic connecting element. As required, the rigidity of the second circumferential ring seal is to be chosen in order to adjust the guidance characteristics as desired. Also in this connection there may be provision that the second circumferential ring seal is integrally formed with the second movable wall.

As already indicated above, the at least one pneumatic connecting element may be guided in sealing manner within the partition. For this purpose there may be provision that a circumferential sliding seal which encompasses the pneumatic connecting element in sealing and relatively movable manner is provided in the partition. This circumferential sliding seal may also be more rigidly or less rigidly designed, by virtue of which the sealing properties, but similarly also the guidance properties, can be determined as desired.

With regard to the configuration of the pneumatic sealing element, there may be provision that this element exhibits a first tubular portion and a tubular portion of smaller diameter in comparison with the first tubular portion, the two tubular portions overlapping one another within an axial region and being connected to one another via at least one connecting web. From this, a relatively stable structure for the pneumatic sealing element is obtained, which is also simple in its manufacture. Accordingly, in this connection there may furthermore be provision that between the two tubular portions there is provided, in addition to the at least one connecting web, at least one connecting channel which leads into the second working chamber. Furthermore, there may be provision that the first tubular portion leads into the first working chamber and that the second tubular portion is closed at the front in relation to the second vacuum chamber.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an axis-including partial sectional view of a vacuum-assisted brake-force booster according to the invention and FIG. 2 is a detail view of a cross-section at the pneumatic sealing element according to FIG. 1.

DETAILED DESCRIPTION OF THE INVENTION

In FIG. 1 a vacuum-assisted brake-force booster according to the invention is represented in an axis-including partial section and is denoted generally by 10. Said booster includes a booster housing 12, into which a force-input member 14 has been introduced along a longitudinal axis A. The force-input member 14 leads into a control-valve device 16, not represented in any detail, which will be elucidated in more detail in its mode of operation in the following. The control-valve device 16 exhibits a control-valve casing 18 which is movable in the booster housing 12 and guided in sealing manner with a seal 20. From the control-valve casing 18 there emanates a force-output member 22 which is capable of being linked to a master-brake-cylinder arrangement which is not shown and via which a braking force can be transmitted to the master-brake-cylinder arrangement.

In the booster housing 12 there is arranged a tandem chamber arrangement 24. The latter includes a first working chamber 26 and also a first vacuum chamber 28, which are pneumatically separated from one another via a first movable wall 30. The tandem chamber arrangement 24 further exhibits a second working chamber 32 which is separated from a second vacuum chamber 36 via a second movable wall 34. In the second vacuum chamber 36 a return spring 38 is arranged which biases the control-valve casing 18 into the initial position in FIG. 1.

The two chamber arrangements, which consist of first working chamber 30 and vacuum chamber 28 and also of second working chamber 32 and vacuum chamber 36, are pneumatically separated from one another by a positionally stable partition 40 fixed in the booster housing 12.

As is generally known in the case of conventional vacuum-assisted brake-force boosters with tandem chamber arrangement, the first working chamber 26 should be pneumatically interconnected with the second working chamber 32. In accordance with the invention, this is done via a pneumatic connecting element 42. The pneumatic connecting element 42 exhibits at its right-hand end in FIG. 1 a flange 44 with which it bears against the first movable wall 30. Said connecting element is received in sealing manner in a sealing cuff 46, the sealing cuff 46 being integrally connected to an elastomeric diaphragm of the movable wall 30, i.e. integrally formed with the latter. It will be discerned that the pneumatic connecting element 42 is of tubular form, exhibiting a first tubular portion 48 and a second tubular portion 50. The first tubular portion 48 leads with its hollow inner space into the first working chamber 26. The second tubular portion 50 is closed in sealing manner at its left-hand end in FIG. 1 with a flange-like front wall 52. The second tubular portion 50 is also received in sealing manner in a sealing cuff 54 which, on the one hand, bears against the flange-like front wall 52 and, on the other hand, encompasses the tubular portion 50 at the end in sealing manner. The cuff 54 is integrally formed with an elastomeric diaphragm of the second movable wall 34.

The first tubular portion 48, of larger diameter, of the pneumatic connecting element 42 is received in a ring seal 56 in sealing but relative movable manner. The ring seal 56 is retained in sealing manner in an aperture of the positionally stable partition 40.

As known as such, the two movable walls 30 and 34 are tightly connected on their radially inner regions 58 and 60 to the control-valve casing 18 for the purpose of joint movement. As a result, a force applied to the movable walls 30 and 34, which results from a difference in pressure between respective working chamber and vacuum chamber, can be transmitted to the control-valve casing 18, whereby the force resulting from this can be delivered via the force-output member 22, supplementing the actuating force introduced via the force-input member 14, to the master-brake-cylinder arrangement which is not shown.

In FIG. 2 a sectional view through the pneumatic connecting element 42, as represented in FIG. 1 along section line II-II, can be discerned. It can be discerned therein that the first tubular portion 48, on which the flange 44 is arranged at the end, is connected to the second tubular portion 50 via four radially extending connecting webs 62. Between these connecting webs 62 four ring-segment-like connecting channels 64 are arranged, via which a pneumatic connection from the first working chamber 26 through the hollow tubular portion 48 into the second working chamber 32 is possible, as shown by the dashed arrow in FIG. 1.

Lastly, fastening bolts 66 and 68 also fitted to the booster housing 12 can be discerned in FIG. 1. With the fastening bolts 66 the brake-force booster 10 is connected to a bulkhead of the motor vehicle. With the fastening bolts 68 a connection to the booster housing is effected.

In operation, i.e. upon actuation of the force-input member via a brake pedal, the two working chambers 26 and 32 are connected to the ambient atmosphere by "opening" of the control valve 16, so that in these chambers, in comparison with the vacuum chambers 28 and 36, an overpressure builds up which is applied respectively to the first and second movable walls 30 and 34. Via the pneumatic connecting element 42 an equalisation of pressure occurs in the two working chambers 26 and 32, corresponding to the dashed arrow according to FIG. 1. The pneumatic connecting element 42 in this case is designed in such a manner that it is connected in sealing manner, via the flange-like front wall 52 and also the two sealing cuffs 46 and 54, respectively to the first movable wall 30 and to the second movable wall 34. The ring seal 56 provides for a sealing guidance of the tubular portion 42.

The pneumatic connecting element 42 consequently offers a reliable pneumatic connection between the two working chambers 26 and 32, which makes it possible for the movable walls 30 and 32 to move relative to one another in substantially synchronous manner, the movement thereof being guided via the sealing element 56 in the positionally stable partition 40. It will be understood that a plurality of pneumatic connecting elements 42 may be arranged, distributed within the chamber arrangement 24 over the periphery of the vacuum-assisted brake-force booster 10. As a result, a jam-free guidance of the movement of the movable walls 30 and 34 within the booster housing 12 is assisted.

Overall, the configuration, according to the invention, of the pneumatic connecting element 42 provides for a permanent pneumatic connection of the two working chambers 26 and 32, which additionally obtains a stabilisation of the movement of the movable walls 30 and 32 and furthermore requires no tension bolts extending right through the booster housing 12, as is the case in the state of the art for instance. As a result, more free spaces present themselves in connection with the construction of the vacuum-assisted brake-force booster 10 according to the invention, in contrast with the state of the art.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Vacuum-assisted brake-force booster for a motor-vehicle braking system with:
    a force-input member which is capable of being coupled with a brake pedal,
    a control-valve device which is capable of being actuated in accordance with a displacement of the force-input member,
    a tandem chamber arrangement with a first and a second working chamber and with a first and a second vacuum chamber and with
    a force-output member for delivering an actuating force to a master-brake-cylinder arrangement,
wherein the first working chamber and the first vacuum chamber are separated from one another via a first movable wall, and the second working chamber and the second vacuum chamber are separated from one another via a second movable wall and in each instance are optionally capable of being connected to one another via the control-valve device and wherein at least one pneumatic connecting element is provided, via which the first working chamber is permanently connected to the second working chamber, and
wherein the pneumatic connecting element is fitted to the first movable wall and to the second movable wall.

2. Vacuum-assisted brake-force booster according to claim 1,
    wherein the pneumatic connecting element is of hollow construction and is guided in sealing manner within a positionally stable partition, the partition separating the first vacuum chamber from the second working chamber in sealing manner.

3. Vacuum-assisted brake-force booster according to claim 2,
    wherein within the partition a circumferential sliding seal is provided which encompasses the pneumatic connecting element in sealing and relatively movable manner.

4. Vacuum-assisted brake-force booster according to claim 1,
    wherein the pneumatic connecting element exhibits an abutment flange with which it bears against the first movable wall.

5. Vacuum-assisted brake-force booster according to claim 1,
    wherein a first circumferential ring seal is arranged between the first movable wall and the pneumatic connecting element.

6. Vacuum-assisted brake-force booster according to claim 5,
    wherein the first circumferential ring seal is integrally formed with the first movable wall.

7. Vacuum-assisted brake-force booster according to claim 5,
    wherein the second circumferential ring seal is integrally formed with the second movable wall.

8. Vacuum-assisted brake-force booster according to claim 1,
    wherein the pneumatic connecting element exhibits a front flange with which it bears against the second movable wall in sealing manner.

9. Vacuum-assisted brake-force booster according to claim 1,
    wherein a second circumferential ring seal is arranged between the second movable wall and the pneumatic connecting element.

10. Vacuum-assisted brake-force booster according to claim 1,
    wherein the pneumatic connecting element exhibits a first tubular portion and a second tubular portion of smaller diameter in comparison with the first tubular portion, the two tubular portions overlapping one another within an axial region and being connected to one another via at least one connecting web.

11. Vacuum-assisted brake-force booster according to claim 10,
    wherein between the two tubular portions there is provided, in addition to the at least one connecting web, at least one connecting channel which leads into the second working chamber.

12. Vacuum-assisted brake-force booster according to claim 10,
    wherein the first tubular portion leads into the first working chamber and in that the second tubular portion is closed at the front in relation to the second vacuum chamber.

* * * * *